United States Patent Office 2,727,814
Patented Dec. 20, 1955

2,727,814

GELATIN DYNAMITE EXPLOSIVE AND METHOD OF MAKING THE SAME

Joseph Smith, Jr., Tamaqua, Pa., assignor to Atlas Powder Company, Wilmington, Del., a corporation of Delaware No Drawing. Application February 26, 1952,
Serial No. 273,553

12 Claims. (Cl. 52—11)

The present invention relates to an improved gelatin dynamite composition; and, more particularly, it relates to gelatin dynamite compositions possessing improved plasticity and extrudability properties. The invention also relates to a method of making gelatin dynamite compositions possessing improved plasticity and extrudability properties.

Gelatin dynamite comprises nitrocotton and nitroglycerin combined to provide a viscous liquid or gelatinous mass, and subdivided solid materials which are insoluble in the nitroglycerin. The subdivided solid materials may range from water-soluble salts such as ammonium nitrate, potassium nitrate and sodium nitrate to water-insoluble materials including combustibles, such as sulfur, carbonaceous fuels, and the like; and chalk. The various ingredients are blended in proportions which may vary widely depending upon the nature of the explosive, e. g., strength, desired. Such compositions are normally filled into cartridges made of paper, or the like, by extrusion. Accordingly, the materials and proportions thereof are generally selected, taking into consideration other factors well known in the art, such as oxygen balance, to provide a plastic mixture which can readily be extruded.

As is well known, the line between extrudability and non-extrudability in such compositions is fine. This fine line is maintained in practice by a balanced relationship between the nitroglycerin and nitrocotton, on the one hand, and the absorptive and adsorptive solid components, on the other. This relationship is selected to provide sufficient plasticity for extrusion without rendering the material so wet as to result in exudation of the nitroglycerin. However, a slight variation in the properties of one of the solid materials, for instance even particle size, or in the proportion thereof, may result in rendering the product which would normally be extrudable, non-extrudable. Closely related to the foregoing difficulty is the phenomenon, often observed, of a final mix which was initially extrudable converting to a non-extrudable, or "dead" mixture upon standing. Attempts to salvage such non-extrudable material have usually involved adding additional nitroglycerin or other liquids such as dinitrotoluene. However, because of the high cost of such liquid materials, because of the upset in oxygen balance which may be occasioned by the addition thereof and because of the danger of inducing subsequent exudation of liquid from the composition, such expedients are not wholly satisfactory.

Attempts have been made to solve the above-discussed problem by the incorporation of other compounds in the gelatin dynamite mix. For example, certain wetting agents of the anionic or non-ionic type have been suggested. In many cases, the addition of materials of these classes has not only had no effect with respect to plasticity but has actually given rise to a secondary disadvantage, namely exudation of the nitroglycerin from the composition after cartridging. Furthermore, certain of such materials may have a deleterious effect on the chemical stability of the explosive composition.

The above-discussed extrudability problem is particularly encountered in the manufacture of ammonia gelatin dynamites, where a portion of the nitroglycerin, the component relied upon to provide extrudability, is replaced by ammonium nitrate.

It is a principal object of the present invention to provide a gelatin dynamite composition having improved plasticity and extrudability properties.

Another object is to provide a gelatin dynamite composition which will retain its plasticity and extrudability properties even over extended periods of time.

Another object is to provide a gelatin dynamite composition which possesses the stated improved plasticity and extrudability properties and from which there is no exudation of the nitroglycerin.

Still another object is to provide an extrudable ammonia gelatin dynamite composition containing less liquid nitric ester and more subdivided solid materials than that which would normally be required to provide an extrudable mixture.

Other objects, including a method of making gelatin dynamite compositions having the aforementioned advantageous features and of treating gelatin dynamite compositions to impart thereto improved plasticity and extrudability, will become apparent from a consideration of the following specification and the claims.

In accordance with the present invention, there is thoroughly dispersed in a gelatin dynamite a small amount of a substituted oxazoline compound having the following formula:

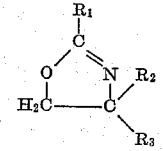

wherein $R_1$ is an alkyl radical having from 7 to 17 carbon atoms; $R_2$ represents hydrogen, methyl, ethyl, hydroxymethyl, hydroxyethyl or a radical represented by —$R_4$—A—OH where $R_4$ represents methylene or ethylene and A represents a radical consisting of from 1 to 6 oxyethylene groups, and wherein $R_3$ represents hydroxymethyl, hydroxyethyl or a radical represented by —$R_4$—A—OH where $R_4$ represents methylene or ethylene and A represents a radical consisting of from 1 to 6 oxyethylene groups, the total number of oxyethylene groups in the compound not exceeding 6. The term "alkyl" used in connection with $R_1$ includes both saturated and unsaturated and straight chain and branched chain radicals.

The oxazoline compounds which produce superior results and which are, therefore, preferred for use in accordance with the invention, are those in which $R_1$ is an alkyl group containing from 11 to 17 carbon atoms; $R_2$ represents hydrogen, methyl or ethyl, and $R_3$ represents hydroxymethyl or the radical represented by the formula —$CH_2$—A—OH where A is a radical consisting of from 1 to 4 oxyethylene groups, advantageously from 1 to 2 oxyethylene groups.

Of the compounds having the above recited structure, the use of 2-heptadecenyl-4-methyl-4-hydroxymethyl-2-oxazoline, and 2-heptadecenyl-4-methyl-4-hydroxy(ethoxy)$_2$ methyl-2-oxazoline are particularly advantageous.

Examples of other compounds which may be employed are:

2-heptadecyl-4-methyl-4-hydroxymethyl-2-oxazoline
2-hendecyl-4-hydroxyethyl-2-oxazoline
2-heptyl-4-methyl-4-hydroxymethyl-2-oxazoline
2-pentadecyl-4-ethyl-4-hydroxyethyl-2-oxazoline
2-heptyl-4-hydroxyethyl-2-oxazoline
2-heptadecyl-4,4 bis(hydroxyethyl)-2-oxazoline
2-octyl-4-methyl-4-hydroxyethyl-2-oxazoline
2-heptadecenyl-4-4-bis[hydroxy(ethoxy)$_3$ ethyl]-2-oxazoline
2-heptyl-4-hydroxyethoxymethyl-2-oxazoline
2-heptadecyl-4-hydroxy(ethoxy)$_4$ ethyl-2-oxazoline
2-hendecyl-4,4-bis[hydroxy(ethoxy)$_2$ methyl]-2-oxazoline Mixtures of substituted oxazolines in which the substituted long chain hydrocarbon radical corresponds to the hydrocarbon radicals of the fatty acids of naturally occurring fats and oils or of mixtures of resin acids and fatty acids such as talloil may be used if desired.

The substituted oxazoline compounds may be prepared by any desired method, for example, by condensing one mol of a fatty acid having from 8 to 18 carbon atoms and one mol of an amino hydroxy compound providing $R_2$ and $R_3$ radicals corresponding to those desired in the substituted oxazoline, with the liberation of two mols of water, for example at temperatures from 150° to 240° C. When $R_2$ or $R_3$, or both, are represented by the radical —$R_4$—A—OH, the substituted oxazoline may be prepared as stated or the compound may be prepared by an additional reaction between ethylene oxide providing the desired number of oxyethylene groups and the appropriate oxazoline. Such reaction is advantageously carried out at elevated temperature and pressure and in the presence of an alkaline catalyst.

It has been found that the incorporation of a small amount of the stated substituted oxazoline compound in gelatin dynamites markedly increases the plasticity thereof. It has also been found that the improved plasticity properties imparted to gelatin dynamite are retained for extended periods. These phenomena can be utilized in a number of ways in accordance with the present invention. Thus, in cases where a minor change in one of the subdivided solid ingredients, for example, a batch of gelatin dynamite may not be satisfactorily extrudable, the incorporation of a small amount of the substituted oxazoline compound therein readily converts the material to a plastic, extrudable condition. Similarly, a small amount of the substituted oxazoline compound may be incorporated in gelatin dynamites which, although initially extrudable, have become non-extrudable through standing, or the like, to convert them to the extrudable state. Moreover, the plasticity and extrudability imparted to gelatin dynamite by the oxazoline compound are retained thus enabling the composition to be held for extended periods before cartridging.

A particularly advantageous utilization of the plasticity-imparting properties of the oxazoline compound is in the case of ammonia gelatin dynamites where, through the addition of the oxazoline compound, significant amounts of nitroglycerin can be replaced by ammonium nitrate in an ammonia gelatin dynamite of any given explosive strength without rendering the composition non-extrudable. This enables a significant reduction in the most costly component of commercial ammonia gelatin dynamites and thus provides an economic advantage.

An important feature of the present invention is the fact that the incorporation of the substituted oxazoline compound in gelatin dynamites will not cause exudation of the nitroglycerin from the mass as is the case when other agents, referred to above, are employed. Another important feature of the invention is the fact that, since only a relatively small amount of the oxazoline compound is required, the alteration of the oxygen balance and of other desired properties of the explosive mixture is almost nil.

Gelatin dynamite is basically a mixture of nitroglycerin with nitrocotton and generally includes in addition such subdivided solid materials as antacids, such as chalk ($CaCO_3$); and fuels, particularly solid carbonaceous fuels such as corn flour, bagasse, wood pulp, apricot pit pulp, and the like, although sulphur may also be used as a fuel. In addition, it may include other ingredients such as explosive nitro compounds, for example, the nitrotoluenes which are generally soluble in nitroglycerin and which may replace a minor portion of the nitroglycerin in the gelatin dynamite mix. Gelatin dynamites also often contain an oxygen-supplying salt such as sodium nitrate and potassium nitrate.

A class of gelatin dynamites are the ammonia gelatin dynamites which contain ammonium nitrate. In such dynamites, a portion of the liquid explosive ingredients is replaced by ammonium nitrate in the proper proportion to provide a composition of the same explosive strength. Since most of the gelatin dynamites are produced as the ammonia gelatin dynamites and since, in such material, the incorporation of the oxazoline compound permits a significant reduction in the proportion of nitroglycerin as mentioned above, the modification and treatment of ammonia gelatin dynamites represent the preferred embodiment of the present invention. There are certain types of ammonia gelatin dynamites which may contain flame-cooling salts such as sodium chloride and ammonium chloride.

The gelatin dynamites of the present invention contain from about 18, more usually from about 20, to about 80% nitroglycerin, depending upon the strength desired, and from about 0.3% to about 7% nitrocotton, usually from about 0.4% to about 5%, the amount of nitrocotton being sufficient to provide a viscous liquid or a gel of the desired consistency with the nitroglycerin as is standard practice. The balance of the composition will be made up of the other usual dynamite ingredients, particularly the subdivided solid materials of the type described herein, and the oxazoline compound. As is well known in the art, a minor proportion of the nitroglycerin may be replaced by explosive nitrocompounds soluble therein, and the presence of such nitrocompounds will be taken into consideration in selecting the proportion of nitroglycerin. Such combinations of nitroglycerin and a small amount of explosive nitrocompounds are substantially equivalent to straight nitroglycerin as defined herein and are so considered in the art. The particular proportions of nitroglycerin to nitrocotton selected will depend, as is well known, upon the amount and nature of solid ingredients included in the explosive. When substantial amounts of solid ingredients are present, the proportion of nitrocotton to nitroglycerin may be such as to provide a more or less viscous liquid, the adsorption and absorption of the solid ingredients being relied upon to provide the basis for plasticity in the mixture. As the proportion of nitrocotton to nitroglycerin is increased, the mixture becomes more viscous until a gel is obtained, and this gel may be relied upon to provide the basis for plasticity. At any rate, the amounts and proportions of nitroglycerin and of nitrocotton, as well as of the solid ingredients, will be selected generally in accordance with common practice to provide the desired explosive characteristic, oxygen balance, and, in conjunction with the substituted oxazoline compound, the desired extrudability, freedom from exudation and enduring softness.

If sodium or potassium nitrate is employed, it will generally be present in an amount from about 3% to about 65%, while fuels will usually be between about 3% and about 25%. In accordance with conventional practice, the proportions of fuel and of sodium or potassium nitrate, when used, may be varied to provide a desirable oxygen balance in the explosive. If ammonium nitrate is used, it may be present in an amount from about 2% to about 50%, depending upon the particular grade of ammonia gelatin dynamite desired. Where a cooling salt is employed, as may be the case in ammonia gelatin dynamites, such salt may be present in amounts up to about 15%.

The nitroglycerin used in the present compositions may be relatively pure glycerin trinitrate or it may be a nitrated mixture of glycerin and ethylene glycol, or other nitratable substances, as is usually employed in the art. The aforesaid nitrated mixture, as well as relatively pure nitroglycerin, is designated in the trade as nitroglycerin and that term is used herein to include both materials.

To aid in preventing the deterioration of the compositions on storage, a stabilizer may be added. For this function, organic amines are preferred, such as, for example, diphenylamine. While the amount of stabilizer added to the composition will vary with the particular composition and the length of time and conditions of storage (especially temperature), in general from about 0.05% to about 1%, based on the weight of the nitroglycerin present, may be employed.

The amount of substituted oxazoline compound employed will be relatively small, amounts as low as about 0.005% by weight, based on the weight of the gelatin dynamite composition, providing improved plasticity properties. Amounts in excess of about 1% generally do not provide advantages over lesser amounts and merely serve as contaminant. Preferably, the substituted oxazoline compound is employed in an amount between about 0.01% and about 0.1%.

The incorporation of the substituted oxazoline compound in the gelatin dynamite will present no problem to those skilled in the art, the main consideration being the complete mixing of the compound with the other ingredients to insure thorough distribution thereof throughout the gelatin dynamite. For this purpose, conventional mixing equipment employed in the manufacture of gelatin dynamites may be employed. The substituted oxazoline compound may be mixed with one or more of the ingredients first followed by the addition of the remaining ingredients. For example, the substituted oxazoline compound may be added to the mixture of nitroglycerin and nitrocotton to which may have been added a portion of the subdivided solid components. After the oxazoline compound has been added to this material, the remaining subdivided solid material may be added and mixed in. On the other hand, particularly in the case where it is desired to convert a non-extrudable or difficulty extrudable gelatin dynamite into extrudable form, the substituted oxazoline compound may be added to and mixed with the gelatin dynamite itself.

The present invention will be more readily understood from a consideration of the following specific examples which are given for the purpose of illustration only and are not intended to limit the scope of the invention in any way:

I

An ammonia gelatin dynamite is prepared from the following ingredients:

|  | Percent |
| --- | --- |
| Nitroglycerin | 24.2 |
| Nitrotoluenes | 1.8 |
| Nitrocotton | 0.5 |
| Ammonium nitrate (wax coated) | 34.5 |
| Sodium nitrate (dried) | 29.8 |
| Dry wood pulp | 1.2 |
| Dry flour | 3.0 |
| Groutnd sulphur | 4.0 |
| Chalk | 1.0 |

The nitroglycerin, nitrotoluenes, and nitrocotton are pregelatinized together in a figure eight mixer for two minutes. The solid ingredients are then added and mixing continued for three minutes. The product, because of insufficient nitroglycerin, is dry, lacking in plasticity and will not pack by extrusion through the nipple of a gelatin packing machine.

Following the same procedure with identical materials and proportions, as above, with the exception that 0.01%, by weight, of 2-heptadecenyl-4-methyl-4-hydroxymethyl-2-oxazoline is added to the gelatinized mixture of nitroglycerin, nitrotoluenes, and nitrocotton before the introduction of the solid ingredients, provides a soft, plastic product which is readily packable by extrusion through the nipple of a gelatin packing machine.

To provide an extrudable mixture without the use of the oxazoline compound, and possessing the same weight strength as the foregoing mixtures, would have required 30% nitroglycerin, 2.3% nitrotoluenes, 0.7% nitrocotton, and 25.7% ammonium nitrate.

II

An ammonia gelatin dynamite is prepared from the following ingredients:

|  | Percent |
| --- | --- |
| Nitroglycerin | 22.75 |
| Nitrotoluenes | 1.40 |
| Nitrocotton | 0.35 |
| Ammonium nitrate (wax coated) | 21.30 |
| Sodium nitrate (dried) | 41.20 |
| Dry wood pulp | 1.50 |
| Dry apricot pit pulp | 2.00 |
| Dry flour | 3.00 |
| Ground sulphur | 5.50 |
| Chalk | 1.00 |

The nitroglycerin, nitrotoluene, and nitrocotton are pregelatinized and the other ingredients added and mixed in the same manner as in Example I. The resulting product, due to insufficient nitroglycerin, is only slightly moist, lacking in plasticity and could be packed by extrusion through the nipple of a gelatin packing machine only with great difficulty.

The addition of only 0.005% of 2-heptadecenyl-4-methyl-4-hydroxymethyl-2-oxazoline to the pregelatinized mass of nitroglycerin, nitrotoluene, and nitrocotton of an identical mixture, however, provides a highly plastic mass which is extruded quickly through the nipple of a gelatin packing machine.

To provide an extrudable mixture without the use of the oxazoline compound and possessing the same weight strength as the above mixtures would have required 27% nitroglycerin, 2% nitrotoluenes, 0.7% nitrocotton, and 14.2% ammonium nitrate.

III

An ammonium gelatin dynamite is prepared from the following ingredients:

|  | Percent |
| --- | --- |
| Nitroglycerin | 20.1 |
| Nitrocotton | 0.4 |
| Ammonium nitrate (wax coated) | 17.4 |
| Sodium nitrate (dried) | 46.5 |
| Dry wood pulp | 0.3 |
| Dry apricot pit pulp | 6.2 |
| Dry flour | 3.5 |
| Ground sulphur | 4.6 |
| Chalk | 1.0 |

The nitroglycerin and nitrocotton are pregelatinized in a figure eight mixer for two minutes. The solid materials are then added and mixing is continued for three minutes. The product is dry, crumbly, and totally lacking in plasticity. It could not be packed by extrusion from the nipple of a gelatin packing machine.

Following the same procedure as above with the exception that 0.1%, by weight, of 2-heptadecenyl-4-methyl-4-hydroxy(ethoxy)₂methyl-2-oxazoline is substituted for 0.1% of nitroglycerin, a moist, cohesive and plastic mixture is provided which extrudes quickly from the gelatin packing machine.

To provide an extrudable mixture without the oxazoline compound and having the same weight strength as the explosives of this example would have required 25.8% nitroglycerin, 0.5% nitrocotton, and 9.1% ammonium nitrate.

IV

An ammonia gelatin dynamite is prepared from the following ingredients:

| | Percent |
|---|---|
| Nitroglycerin | 24.2 |
| Nitrotoluenes | 1.8 |
| Nitrocotton (water wet) | [1] 0.5 |
| Ammonium nitrate (wax coated) | 34.5 |
| Sodium nitrate (dried) | 29.8 |
| Dry wood pulp | 1.7 |
| Dry flour | 2.5 |
| Ground sulphur | 4.0 |
| Chalk | 1.0 |

[1] Dry basis.

The nitroglycerin and nitrotoluenes are introduced into a figure eight mixer following which the rest of the ingredients are added. The materials are mixed for about one minute, producing a dry, crumbly mass.

2-heptadecenyl-4-methyl-4- hydroxymethyl-2-oxazoline, in an amount of 0.036%, by weight of the mixture, is then added and mixed into the explosive until a plastic mass readily extrudable from a multiple-nipple gelatin cartridging machine into 1¼" x 8" shells is produced.

The ingredient weight strength, sensitiveness, and detonation velocity—confined and unconfined—are substantially the same as those of an explosive prepared in the same manner, but without the addition of the substituted oxazoline compound, and using the following:

| | Percent |
|---|---|
| Nitroglycerin | 30.0 |
| Nitrotoluenes | 2.1 |
| Nitrocotton (water wet) | [1] 0.9 |
| Ammonium nitrate (wax coated) | 25.7 |
| Sodium nitrate (dried) | 31.8 |
| Dry wood pulp | 2.0 |
| Dry apricot pit pulp | 1.2 |
| Dry flour | 3.2 |
| Ground sulphur | 2.1 |
| Chalk | 1.0 |

[1] Dry basis.

V

An ammonia gelatin dynamite is prepared from the following ingredients:

| | Percent |
|---|---|
| Nitroglycerin | 21.2 |
| Nitrotoluenes | 0.9 |
| Nitrocotton (water wet) | [1] 0.5 |
| Ammonium nitrate (wax coated) | 2.8 |
| Sodium nitrate (dried) | 57.6 |
| Dry walnut hull meal | 4.9 |
| Undried flour | 5.6 |
| Ground sulphur | 5.5 |
| Chalk | 1.0 |

[1] Dry basis.

The nitroglycerin, nitrotoluenes, and nitrocotton are added to a figure eight mixer and pregelatinized for two minutes. The solid ingredients are then added and mixing continued for four minutes. The mixture is dry and cannot be packed into 1½" x 8" shells by extrusion from a multiple-nipple gelatin cartridging machine.

By adding 2-heptadecenyl-4-methyl-4-hydroxymethyl-2-oxazoline, in an amount of 0.024%, by weight, of the mixture, the mixture is rendered plastic and readily packable into 1½" x 8" shells by extrusion from a multiple-nipple gelatin cartridging machine.

VI

A gelatin dynamite is prepared from the following ingredients:

| | Percent |
|---|---|
| Nitroglycerin | 23.0 |
| Nitrotoluenes | 0.8 |
| Nitrocotton (wet) | [1] 0.6 |
| Sodium nitrate (dried) | 58.6 |
| Dry wood pulp | 1.0 |
| Dry apricot pit pulp | 2.5 |
| Dry flour | 7.0 |
| Ground sulphur | 5.5 |
| Chalk | 1.0 |

[1] Dry basis.

The nitroglycerin, nitrotoluenes, and nitrocotton are added to a figure eight mixer and pregelatinized for two minutes. The solid ingredients are then added and mixing is continued for three minutes. The product is dry, crumbly and so lacking in plasticity that it cannot be packed by extrusion from a gelatin packing machine.

By adding 0.02% of 2-heptadecenyl-4-methyl-4-hydroxy-methyl-2-oxazoline and mixing for one minute, the mixture is converted into a soft, very plastic mass which is extruded quickly from a gelatin packing machine.

VII

A dry, crumbly gelatin dynamite is prepared according to Example VI. To this product is added 0.02% of 2-heptadecenyl-4-methyl-4-hydroxy (ethoxy)₂ methyl-2-oxazoline and the material is mixed for one minute. The product is soft, very plastic and is extruded quickly from a cartridge packing machine.

Considerable modification is possible in the particular substituted oxazoline compound employed as well as in the selection of the various ingredients of the gelatin dynamite composition and proportions thereof without departing from the scope of the invention.

I claim:

1. A gelatin dynamite comprising nitroglycerin, nitrocotton, subdivided solids and, thoroughly dispersed therein, between about .005% and about 1% of a substituted oxazoline having the formula:

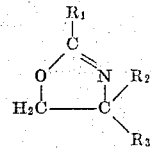

wherein $R_1$ is an alkyl radical having from 7 to 17 carbon atoms; $R_2$ is selected from the group consisting of hydrogen, methyl, ethyl, hydroxymethyl, hydroxyethyl and —$R_4$—A—OH where $R_4$ is selected from the group consisting of methylene and ethylene and where A is a radical consisting of from 1 to 6 oxyethylene groups; and wherein $R_3$ is selected from the group consisting of hydroxymethyl, hydroxyethyl and —$R_4$—A—OH where $R_4$ is selected from the group consisting of methylene and ethylene and A is a radical consisting of from 1 to 6 oxyethylene groups, the total number of oxyethylene groups in the compound not exceeding 6.

2. The product of claim 1 wherein, in the substituted oxazoline, $R_2$ is methyl and $R_3$ is hydroxymethyl.

3. The product of claim 2 wherein the substituted oxazoline is 2-heptadecenyl-4-methyl-4-hydroxymethyl-2-oxazoline.

4. The product of claim 1 wherein in the substituted oxazoline $R_2$ is methyl and $R_3$ is a radical having the formula —$CH_2$—A—OH where A is a radical consisting of from 1 to 2 oxyethylene groups.

5. The product of claim 4 wherein the substituted oxazoline is 2-heptadecenyl-4-methyl-4-hydroxy (ethoxy)$_2$ methyl-2-oxazoline.

6. An ammonia gelatin dynamite comprising nitroglycerin, nitrocotton and ammonium nitrate and, thoroughly dispersed therein, between about .005% and about 1% of a substituted oxazoline compound having the formula:

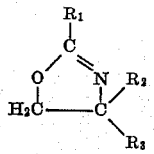

wherein $R_1$ is an alkyl radical having from 7 to 17 carbon atoms; wherein $R_2$ is selected from the group consisting of hydrogen, methyl, ethyl, hydroxymethyl, hydroxyethyl and a radical represented by —$R_4$—A—OH where $R_4$ is selected from the group consisting of methylene and ethylene and where A is a radical consisting of from 1 to 6 oxyethylene groups; and wherein $R_3$ is selected from hydroxymethyl, hydroxyethyl and a radical represented by —$R_4$—A—OH where $R_4$ is selected from the group consisting of methylene and ethylene and where A represents a radical consisting of from 1 to 6 oxyethylene groups, the total number of oxyethylene groups in the compound not exceeding 6.

7. The product of claim 6 wherein, in the substituted oxazoline, $R_2$ is methyl and $R_3$ is hydroxymethyl.

8. The product of claim 7 wherein the substituted oxazoline is 2-heptadecenyl-4-methyl-4-hydroxymethyl-2-oxazoline.

9. The product of claim 6 wherein, in the substituted oxazoline, $R_2$ is methyl and $R_3$ is a radical having the formula —$CH_2$—A—OH where A is a radical consisting of from 1 to 2 oxyethylene groups.

10. The product of claim 9 wherein the substituted oxazoline is 2-heptadecenyl-4-methyl-4-hydroxy (ethoxy)$_2$ methyl-2-oxazoline.

11. In the manufacture of gelatin dynamite comprising the mixing of nitroglycerin, nitrocotton and subdivided solid materials, the improvement which comprises thoroughly dispersing in the gelatin dynamite mix between about .005% and about 1% of a substituted oxazoline having the formula:

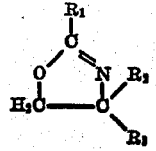

wherein $R_1$ is an alkyl radical having from 7 to 17 carbon atoms; $R_2$ is selected from the group consisting of hydrogen, methyl, ethyl, hydroxymethyl, hydroxyethyl and —$R_4$—A—OH where $R_4$ is selected from the group consisting of methylene and ethylene and where A is a radical consisting of from 1 to 6 oxyethylene groups; and wherein $R_3$ is selected from the group consisting of hydroxymethyl, hydroxyethyl and —$R_4$—A—OH where $R_4$ is selected from the group consisting of methylene and ethylene and A is a radical consisting of from 1 to 6 oxyethylene groups, the total number of oxyethylene groups in the compound not exceeding 6.

12. The method of treating a gelatin dynamite of insufficient plasticity readily to be extruded to impart plasticity and extrudability properties thereto which comprises thoroughly dispersing in said dynamite between about .005% and about 1% of a substituted oxazoline having the formula:

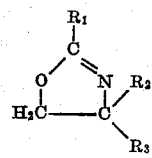

wherein $R_1$ is an alkyl radical having from 7 to 17 carbon atoms; $R_2$ is selected from the group consisting of hydrogen, methyl, ethyl, hydroxymethyl, hydroxyethyl and —$R_4$—A—OH where $R_4$ is selected from the group consisting of methylene and ethylene and where A is a radical consisting of from 1 to 6 oxyethylene groups; and wherein $R_3$ is selected from the group consisting of hydroxymethyl, hydroxyethyl and —$R_4$—A—OH where $R_4$ is selected from the group consisting of methylene and ethylene and A is a radical consisting of from 1 to 6 oxyethylene groups, the total number of oxyethylene groups in the compound not exceeding 6.

References Cited in the file of this patent

UNITED STATES PATENTS

| | | |
|---|---|---|
| 2,352,152 | Kaplan | June 20, 1944 |
| 2,372,410 | Tryon | Mar. 27, 1945 |
| 2,554,179 | Fordham | May 22, 1951 |